Figure 1:
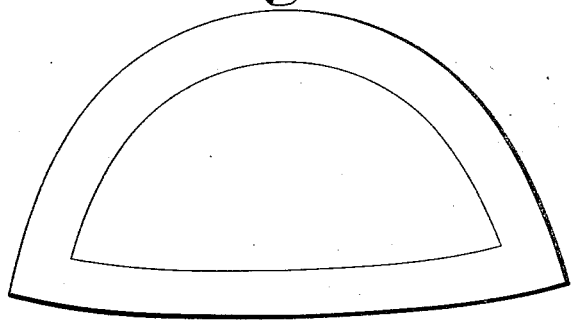

April 5, 1932.  W. J. LUND  1,852,018
STIFFENER FOR BOOTS AND SHOES AND METHOD OF MAKING THE STIFFENER
Filed April 23, 1929

FLEXIBLE BOND

INVENTOR
William Jackson Lund
By his Attorney,
Nelson W. Howard

Patented Apr. 5, 1932

1,852,018

UNITED STATES PATENT OFFICE

WILLIAM JACKSON LUND, OF LEICESTER, ENGLAND, ASSIGNOR TO UNITED SHOE MACHINERY CORPORATION, OF PATERSON, NEW JERSEY, A CORPORATION OF NEW JERSEY

STIFFENER FOR BOOTS AND SHOES AND METHOD OF MAKING THE STIFFENER

Application filed April 23, 1929, Serial No. 357,524, and in Great Britain June 2, 1928.

This invention relates to a stiffener for the uppers of boots and shoes and to a method of making it and is herein described as embodied in a thermoplastic toe stiffener and its manufacture.

A thermoplastic toe stiffener is subject to two opposed requirements, first, it should be capable of being softened by heat and of remaining soft while it is being conformed to the toe portion of the last during the manufacture of the shoe, and, second, it should resist softening by unusual solar heat, when, for example, the finished shoe in which it is incorporated is exposed to the sun for long periods in a shop window or when the shoe is worn in a tropical country. In order to meet these two opposed requirements thermoplastic stiffeners have been developed containing a layer of heat-resistant material which is not thermoplastic, the layer being a thin somewhat flexible one which does not interfere with the conforming of the heated stiffener to the last during the manufacture of the shoe, but which, in the finished shoe, has enough strength to prevent the stiffened portion of the upper of the shoe from sagging when exposed to solar heat in the manner referred to above.

An object of the present invention is to provide an improved stiffener of the type last described and a method of making the stiffener.

According to the method, a plurality of layers of suitable porous sheet material are bonded together by means of a non-thermoplastic adhesive substance in an aqueous vehicle, and the laminated material thus formed is impregnated with a thermoplastic substance. For example, starch paste containing diethylene glycol may be used to bond together two sheets of cotton flannel; and when the laminated sheet material has dried, it may be immersed in the molten thermoplastic substance to impregnate it. Inasmuch as the boiling point of diethylene glycol is much higher than any temperature to which the stiffener is subjected either during its manufacture or during the manufacture of the shoe in which it is subsequently incorporated, a certain amount of this liquid remains in the starch and serves to mollify the starch, which would otherwise dry to a hard brittle condition, so as to make it flexible.

The resultant stiffener thus comprises a laminated base having its layers bonded together by an adhesive substance containing a mollifying agent, said base being impregnated with thermoplastic material. When such a stiffener is incorporated in the toe portion of the upper of a shoe, the flexible bond will prevent the toe portion of the upper from sagging if the shoe is subjected to unusual heat.

Figure 2:

Referring to the accompanying drawings, Fig. 1 is a plan of a toe stiffener in which the invention is embodied, and Fig. 2 is a cross-section of a portion of the stiffener on an enlarged scale.

The illustrated stiffener comprises two layers of fabric bonded together by means of a non-thermoplastic adhesive substance in an aqueous vehicle and subsequently impregnated with a thermoplastic substance. The margin of the stiffener may be beveled, as indicated in Fig. 1, either by being skived or by being subjected simultaneously to heat and pressure.

As an example of one way in which the stiffener may be manufactured, a starch paste is made by mixing two parts by weight of dry starch paste powder with sixteen parts by weight of water and adding one part by weight of diethylene glycol. This paste is used to bond together two layers of a suitable fabric such, for example, as cotton flannel. After the water has dried out, the starch bond, because of the presence of the diethylene glycol, does not become stiff and brittle as it otherwise would but remains flexible. The laminated fabric thus bonded is then impregnated by being immersed in a bath of molten thermoplastic material such, for example, as a mixture of 75 per cent colophany and 25 per cent blown asphalt and allowed to cool, after which the stiffeners are died out of it. The temperature of the bath varies somewhat, depending upon the thermoplastic ingredients which are used, and is approximately 130° C.; but inasmuch as the boiling point of the diethylene glycol is 250° C., the diethylene glycol remains in the stiffener and serves to maintain the starch bond in a flexible condition.

Other water soluble adhesive substances, such, for example, as glue, and other high boiling liquids, which are miscible or somewhat miscible with water, such, for example, as glycerine and Turkey red oil, may be used. Instead of using a high boiling liquid as a mollifying agent, very good results may be secured by using rubber latex; and a bond which has proved to be satisfactory may be made by the use of starch paste mixed with rubber latex in such proportions that the mixture contains two parts by weight of starch to one part by weight of rubber solids. The particular thermoplastic substance or substances used are immaterial; and any of the well-known substances such as Montan wax, dammar, copal and various waxes and resins may be employed.

Having thus described my invention, what I claim as new and desire to secure by Letters Patent of the United States is:—

1. The method of making a thermoplastic stiffener for boots and shoes which comprises bonding together a plurality of pieces of porous sheet material by means of an adhesive substance capable of being dispersed in water and a mollifying agent therefor, impregnating the laminated sheet material with a thermoplastic substance, and cutting out the stiffener from the laminated impregnated material.

2. The method of making a thermoplastic stiffener for boots and shoes which comprises bonding together a plurality of pieces of porous sheet material by means of an adhesive substance capable of being dispersed in water and a mollifying agent therefor, impregnating the laminated sheet material with a molten thermoplastic substance, and cutting out the stiffener from the laminated impregnated material.

3. The method of making a thermoplastic stiffener for boots and shoes which comprises bonding together a plurality of pieces of porous sheet material by means of a non-thermoplastic adhesive substance capable of being dispersed in water containing a liquid having a boiling point higher than the melting point of the thermoplastic substance to be used, impregnating the laminated sheet material with the thermoplastic substance in molten conditon, and cutting out the stiffeners from the laminated, impregnated material.

4. The method of making a thermoplastic stiffener for boots and shoes which comprises bonding together a plurality of pieces of porous sheet material by means of starch paste containing a liquid having a boiling point higher than the melting point of the thermoplastic substance to be used, impregnating the laminated sheet material with the thermoplastic substance in molten condition, and cutting out stiffeners from the laminated impregnated material.

5. The method of making a thermoplastic stiffener for boots and shoes which comprises bonding together a plurality of pieces of porous sheet material by means of starch paste containing diethylene glycol, impregnating the laminated sheet material with the thermoplastic substance in molten condition, and cutting out stiffeners from the laminated impregnated material.

6. A stiffener for boots and shoes comprising a laminated base impregnated with a thermoplastic substance, the layers of the base being bonded together by a non-thermoplastic adhesive substance capable of being dispersed in water containing a mollifying agent.

7. A stiffener for boots and shoes comprising a laminated base impregnated with a thermoplastic substance, the layers of the base being bonded together by a non-thermoplastic adhesive substance capable of being dispersed in water containing a liquid having a boiling point which is higher than the melting point of the thermoplastic substance.

8. A stiffener for boots and shoes impregnated with a thermoplastic substance, the base of the stiffener consisting of a plurality of layers of porous sheet material bonded together by a non-thermoplastic adhesive substance capable of being dispersed in water containing a liquid which is miscible with water and has a boiling point which is higher than the melting point of the thermoplastic substance.

9. A stiffener for boots and shoes impregnated with a thermoplastic substance, the base of the stiffener consisting of a plurality of layers of porous sheet material bonded together by a non-thermoplastic adhesive substance capable of being dispersed in water containing a liquid which is miscible with water and is stable when subjected to a degree of heat sufficient to melt the thermoplastic substance.

10. A stiffener for boots and shoes comprising a laminated base impregnated with a thermoplastic substance, the layers of the base being bonded together by starch containing a liquid having a boiling point higher than that of the thermoplastic substance.

In testimony whereof I have signed my name to this specification.

WILLIAM JACKSON LUND.